United States Patent [19]

Koral

[11] 4,381,696
[45] May 3, 1983

[54] MICROWAVE COFFEE MAKING APPARATUS

[75] Inventor: Joseph R. Koral, Manitowoc, Wis.

[73] Assignee: Mirro Corporation, Manitowoc, Wis.

[21] Appl. No.: 257,629

[22] Filed: Apr. 27, 1981

[51] Int. Cl.³ .......................... A47J 31/00; H05B 6/64
[52] U.S. Cl. ...................................... 99/304; 99/306; 219/10.55 E
[58] Field of Search .................. 99/299, 300, 304, 305, 99/306, 279; 219/10.55 E

[56] References Cited

U.S. PATENT DOCUMENTS

| | | |
|---|---|---|
| 2,601,067 | 7/1952 | Spencer . |
| 2,978,562 | 4/1961 | Fox . |
| 3,333,527 | 8/1967 | Bender .................. 99/305 |
| 3,333,528 | 8/1967 | Bender .................. 99/305 |
| 3,384,004 | 5/1968 | Perlman et al. . |
| 3,405,630 | 10/1968 | Weber . |
| 3,570,390 | 3/1971 | Jordan . |
| 3,589,273 | 6/1971 | Karlen . |
| 3,590,724 | 7/1971 | Lorang . |
| 3,628,446 | 12/1971 | Raiteri .................. 99/305 |
| 3,672,907 | 6/1972 | Hudson . |
| 3,844,206 | 10/1974 | Weber . |
| 3,902,408 | 9/1975 | Führner . |
| 3,920,945 | 11/1975 | Smith et al. . |
| 3,974,354 | 8/1976 | Long . |
| 3,996,846 | 12/1976 | Hupf . |
| 4,104,957 | 8/1978 | Freedman et al. . |
| 4,132,239 | 1/1979 | Bowen et al. . |
| 4,158,464 | 6/1979 | Bowen et al. . |
| 4,190,077 | 2/1980 | Bowen et al. . |

FOREIGN PATENT DOCUMENTS 574823 4/1959 Canada .

OTHER PUBLICATIONS

Amana Radarange Microwave Oven Coffee Maker brochure.
Finn U.S. Patent Application Serial No. 846,321, filed Oct. 28, 1977, now abandoned.
Ernst E. Lockhart, "Characteristics of Coffee Relating to Beverage Quality", (Coffee Brewing Institute, May 1959).
Coffee Brewing Workshop Manual (The Coffee Brewing Center of the Pan American Coffee Bureau, Publication No. 54).

*Primary Examiner*—Robert W. Jenkins
*Attorney, Agent, or Firm*—Hume, Clement, Brinks, Willian & Olds, Ltd.

[57] ABSTRACT

A microwave coffee making apparatus (10), adapted for use in a microwave oven to heat water (66), has a water reservoir (12) with at least one aperture (49) near the bottom thereof, a coffee grounds basket (13) positioned to receive water from at least one water reservoir aperture (49), a pitcher (11) positioned to receive brewed coffee (17) from the coffee grounds basket (13), and a manually operated valve means (14) located adjacent the at least one water reservoir aperture (49) to control draining of the water reservoir (12) into the coffee grounds basket (13). To brew coffee (17) with this coffee making apparatus (10), the water reservoir (12) is filled with the desired amount of water (66), a measured amount of coffee grounds (37) is placed in the coffee grounds basket (13), the flow of water (66) from the water reservoir (12) is initiated by opening the valve (14), and microwave energy is applied to the coffee making apparatus (10) to heat the water. Preferably, the valve (14) has a plunger rod (51) positioned such that the mounting of a cover (67) on the reservoir (12) depresses the plunger rod (51) and opens the valve (14).

11 Claims, 8 Drawing Figures

U.S. Patent May 3, 1983 Sheet 1 of 2 4,381,696
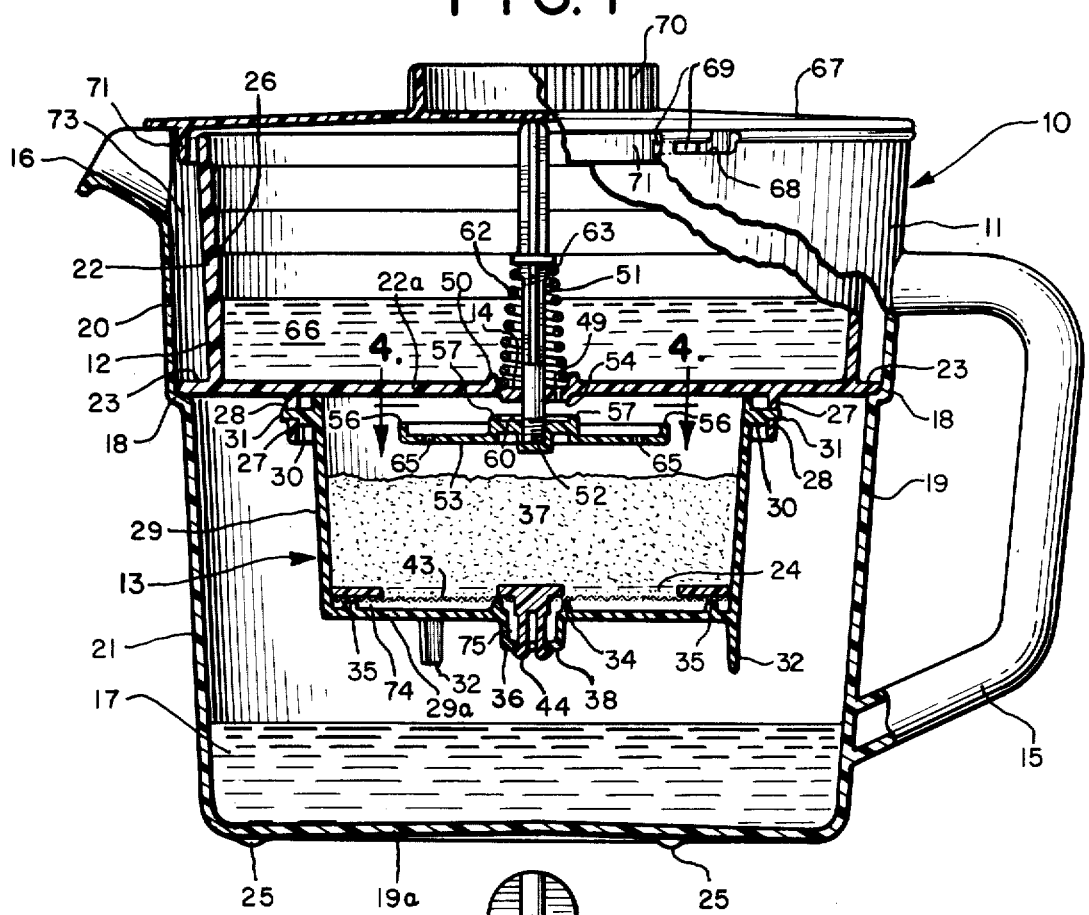
FIG. 1
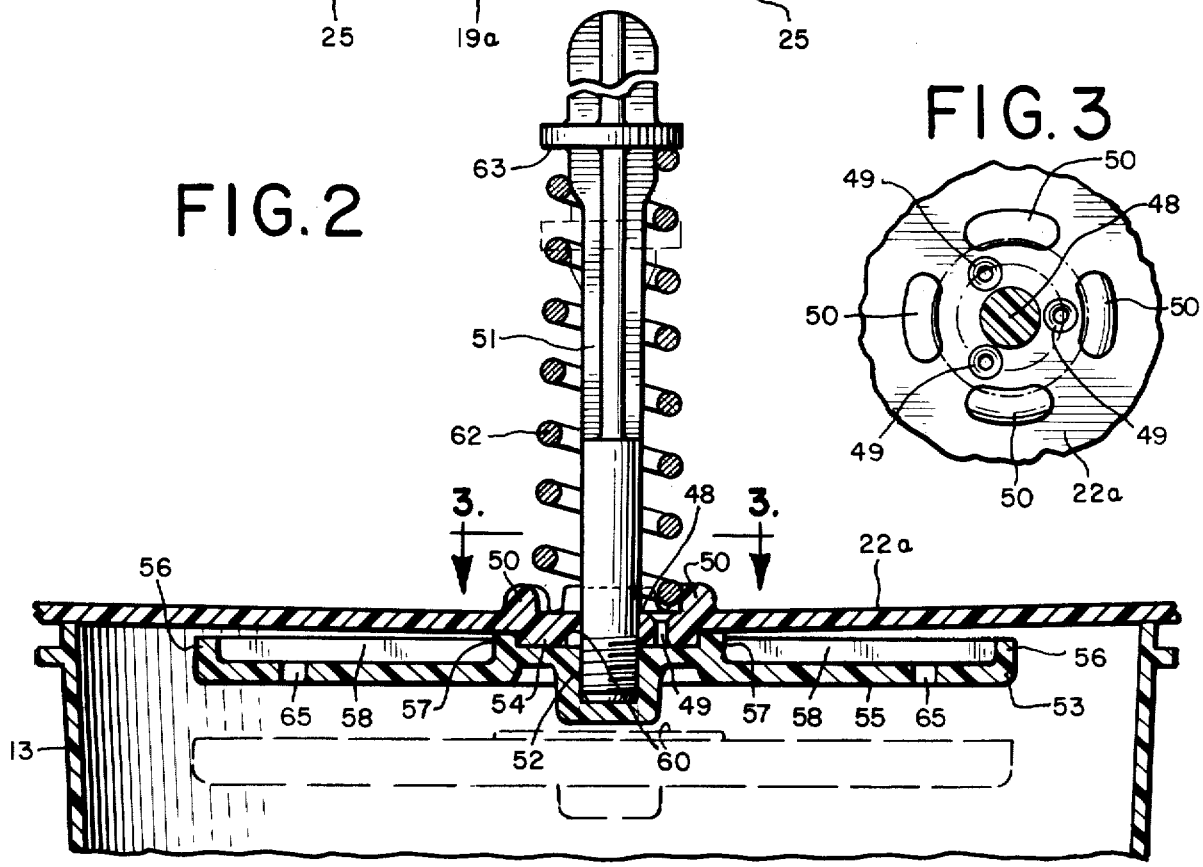
FIG. 2
FIG. 3

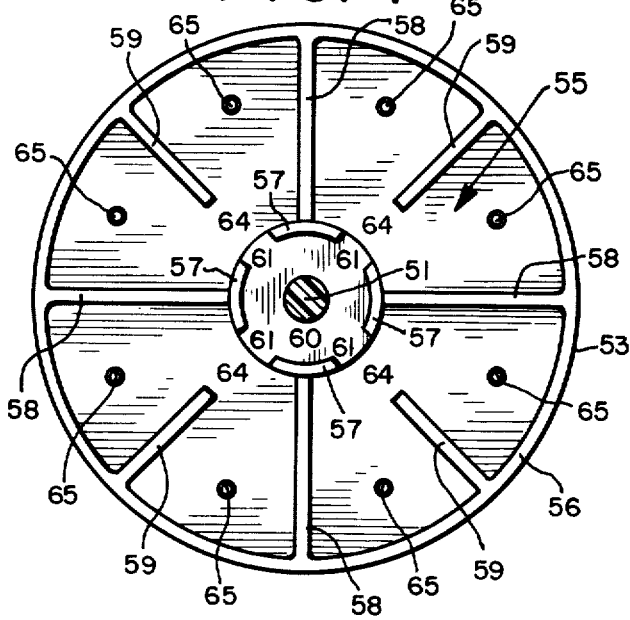
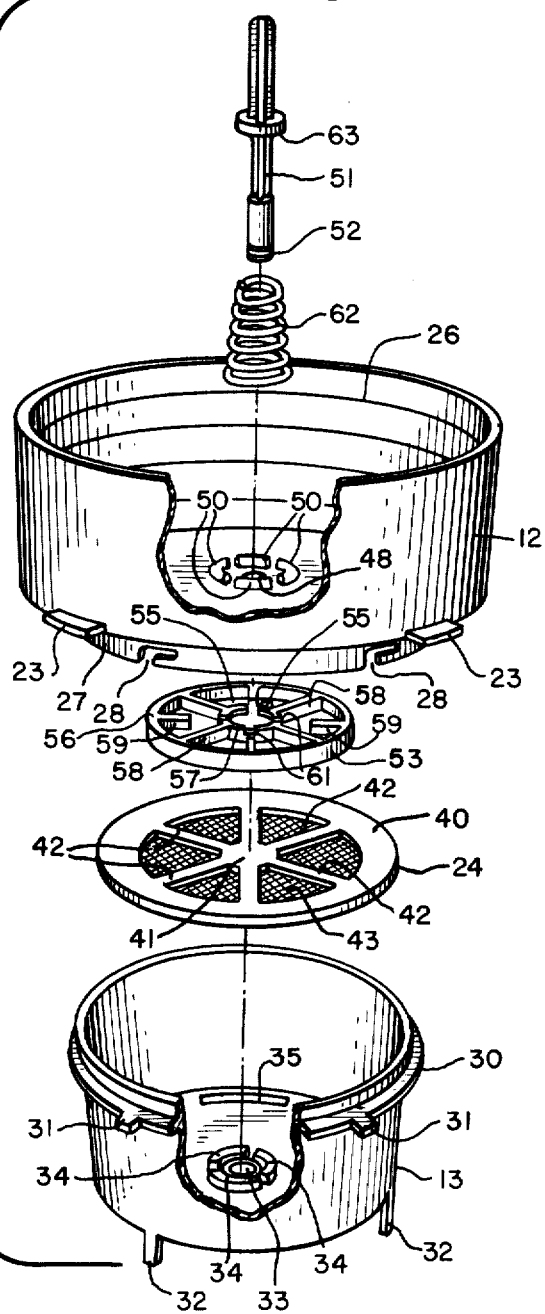
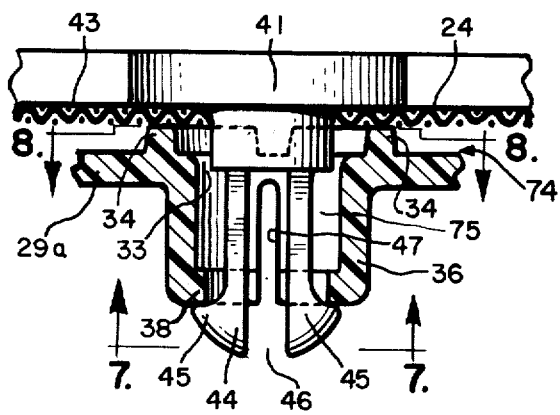
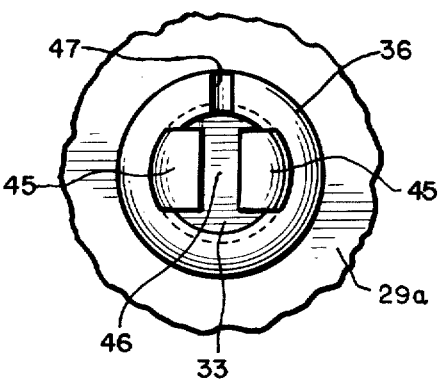
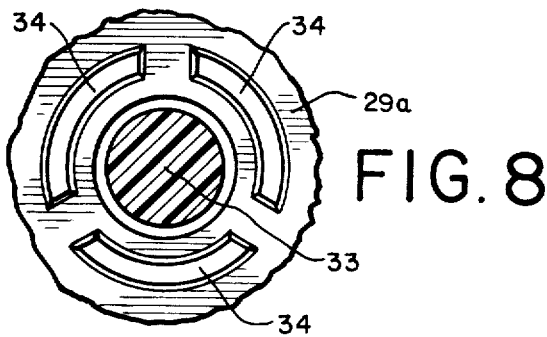

MICROWAVE COFFEE MAKING APPARATUS

BACKGROUND OF THE INVENTION

This invention relates to improvements in driptype apparatus for brewing coffee, tea, or other beverages and, in particular, an improved microwave coffee maker and method of making coffee.

Microwave coffee makers are known to the art. They are generally of the type in which the coffee making apparatus, containing coffee grounds and water in separate compartments, is placed in a microwave oven to heat the water. In the prior art microwave coffee makers, when the water is sufficiently heated, it is then released from its own compartment and allowed to drip through the coffee grounds into a pitcher.

An example of such a microwave coffee maker is the Amana Radarange Microwave Oven Coffee Maker, as described in the instruction booklet that accompanies the product. This coffee maker includes a water reservoir having a thermally-controlled valve in the bottom. The reservoir is positioned above a filtering basket over a carafe. To make coffee, the desired amount of water is placed in the reservoir and a measured amount of coffee grounds is placed in the basket. The coffee maker is assembled with the reservoir placed above the basket on top of the carafe, the coffee maker is placed in a microwave oven, and the oven is turned on to heat the water. When the water is sufficiently heated, the thermally-controlled valve opens to allow the water to drip through the coffee grounds into the carafe below. The microwave oven is to be turned off when coffee begins to drip into the carafe.

The teaching of the coffee brewing art prior to this present invention has been that for best results the temperature of the water contacting the coffee grounds should be below the boiling point and above about 185° F. (approx. 85° C.). For example, the "Coffee Brewing Workshop Manual" of the Coffee Brewing Center of the Pan-American Coffee Bureau (Publication No. 54) states that the water temperature should be 200° F. plus or minus 5° F. (approx. 93° C. plus/minus 3° C.). And Ernest E. Lockhardt, in "Characteristics of Coffee Relating to Beverage Quality" (Coffee Brewing Institute, May 1959) recommends water temperatures above 185° F. (approx. 85° C.). Both references state that lower water temperatures will result in poor extraction and thereby detract from the quality of the brewed coffee. As a consequence of this teaching, it has typically been an objective in the art of coffee maker design, including those coffee makers for use in microwave ovens, to allow only sufficiently heated water (i.e., above approximately 185° F. or 85° C.) to come into contact with the coffee grounds.

Adherence to this objective has caused the prior art microwave coffee makers to suffer from certain disadvantages, however. One disadvantage is that the period of time required by these coffee makers to brew a pot of coffee is relatively lengthy, being approximately equal to the time it takes to heat the water to the desired temperature plus the time required for the water to drip through the coffee grounds.

Another disadvantage is that these coffee makers must utilize some means, such as the temperature controlled valve described above, for controlling the release of water onto the coffee grounds so that it does not occur until the water has been sufficiently heated in the reservoir. This requirement increases the complexity of the prior art coffee makers.

SUMMARY OF THE INVENTION

The present invention is directed to improvements in microwave coffee making apparatus and methods, which improvements avoid the above-mentioned and other disadvantages of the prior art.

According to the present invention, the flow of water onto the coffee grounds is initiated prior to or during application of water-heating microwave energy to the coffee maker. The microwave coffee making apparatus of the present invention includes a water reservoir with an aperture near the bottom thereof, a coffee grounds basket positioned to receive water from the water reservoir aperture, and a pitcher positioned to receive brewed coffee from the coffee grounds basket. A manually operated valve means is located adjacent the water reservoir aperture to control draining of the water reservoir into the coffee grounds basket.

To make coffee in this microwave coffee making apparatus, the reservoir is filled with a desired amount of water and a measured amount of coffee grounds is placed in the coffee grounds basket. Flow of water from the reservoir to the coffee grounds basket is then initiated and microwave energy is applied to the coffee making apparatus to heat the water.

It is anticipated that this invention can be used to prepare hot beverages of various types. The remainder of this specification will use coffee as an example but the invention is not limited to this use.

In a preferred embodiment of the apparatus of this invention, the valve is normally closed, and is preferably mounted at the bottom of the reservoir. The valve of the preferred embodiment has a spring-actuated plunger rod for controlling the valve. The plunger rod is disposed such that it can be selectively manually operated, preferably by being pressed axially downwardly by a cover securely placed on top of the water reservoir. The operation of the plunger opens the valve and initiates the gradual draining of water from the water reservoir into the coffee grounds basket. The coffee maker is adapted for use in a microwave oven to heat the water. The valve is opened prior to or during the activation of the microwave oven with the coffee maker inserted therein, thereby initiating the flow of water onto the coffee grounds immediately before or substantially at the time of application of microwave energy to the coffee maker.

As the flow of water onto the coffee grounds of the preferred embodiment is initiated substantially at the time that microwave energy is applied to the coffee maker to warm the water, the amount of time required to brew a pot of coffee is substantially reduced to about the time needed to drain the water from the reservoir through the coffee grounds and into the pitcher, which is designed to be about the time required to result in a finished brew of the desired temperature, such as between about 170° F. and about 190° F. (approx. 76° C. to 88° C.). The temperature of the water which comes into contact with the coffee grounds may, of course, vary over a substantially wider temperature range, such as for example between about 60° F. and about 212° F. (approx. 15° C. to 100° C.).

Furthermore, because the valve utilized in the improved coffee maker embodying the present invention is a manually controlled valve, as opposed to an automatic valve such as a thermally-operated valve, the valve herein utilized can be made more simple, and therefore less expensive, resulting in lower cost for the improved coffee maker.

The invention itself, together with further objects and attendant advantages, will be best understood by reference to the following detailed description taken in connection with the accompanying drawings.

BRIEF DESCRIPTION OF THE DRAWINGS

FIG. 1 is a cut-away side view of an improved microwave coffee maker including one preferred embodiment of the present invention;

FIG. 2 is a sectional side view of the valve of FIG. 1;

FIG. 3 is a detailed top view of the center of the bottom of the reservoir of FIG. 1, taken along line 3—3 of FIG. 2;

FIG. 4 is a top view of the spreader plate of FIG. 1, taken along line 4—4 of FIG. 1;

FIG. 5 is an exploded view of the reservoir, valve and basket of FIG. 1;

FIG. 6 is a detailed cut-away view of the filter retaining mechanism of FIG. 1;

FIG. 7 is a detailed bottom view of the filter retaining mechanism of FIG. 1, taken along line 7—7 of FIG. 6; and FIG. 8 is a detailed top view of the center of the bottom of the basket of FIG. 1.

DETAILED DESCRIPTION OF THE PREFERRED EMBODIMENT

Referring now to the drawings, FIG. 1 shows a preferred embodiment of an improved microwave coffee maker 10 of the present invention. The coffee maker 10 includes a coffee pitcher 11, a water reservoir 12, a coffee ground basket 13, and a valve 14 for draining the reservoir 12.

The pitcher 11 is a molded shell having a substantially cylindrical pitcher side wall 19 with one end of the cylinder closed by a pitcher bottom wall 19a. The pitcher 11 has a handle 15 for holding the pot and a pour spout 16 for facilitating the pouring of coffee 17 from the pitcher 11, both molded integrally with the pitcher 11. For use as a measure, the pitcher 11 bears volume gradations (not shown) on the pitcher side wall 19. On the outer side of the pitcher bottom wall 19a, the pitcher 11 has three feet 25. The feet 25 are also molded integrally with the pitcher 11. They give stability to the pitcher 11 while it is standing on a surface, and they provide separation between the pitcher bottom surface 19a, which may be hot, and the surface on which the pitcher 11 is standing. The pitcher 11 further has a circumferential step 18 molded in the upper portion of the pitcher side wall 19. The circumferential step 18 separates the pitcher 11 into a wider upper portion 20 and a narrower lower portion 21.

The water reservoir 12 is also a molded shell, having a substantially cylindrical reservoir side wall 22 with one end of the cylinder closed by a reservoir bottom wall 22a. The reservoir 12 is removably seated on the circumferential step 18 inside the pitcher upper portion 20. The reservoir 12 has a diameter smaller than that of the pitcher upper portion 20; thus a circular space 73 is formed between their walls. For seating upon the circumferential step 18, the reservoir bottom wall 22a has peripheral ledges 23, shown more clearly in FIG. 5: the peripheral ledges 23 extend beyond the reservoir side wall 22 and rest on the circumferential step 18. The reservoir side wall 22 has cup gradations 26 marked thereon for indicating the volume of water 66 of the reservoir 12 up to each gradation. The cup gradations 26 indicate the three, four and five coffee cup (of 5 fl. oz. (approx. 150 ml.) each) water level. Extending downwardly from the outer side of the reservoir bottom wall 22a is a holding ring 27 molded integral with the reservoir bottom wall 22a. The holding ring 27 serves to hold the basket 13 suspended from the reservoir 12 and for stably standing the reservoir 12 on a surface when the reservoir 12 is removed from the pitcher 11 and the basket 13 is disconnected. For the purpose of the holding basket 13 suspended therefrom, the holding ring 27 has "L"-shaped holding notches 28 formed therein, as shown more clearly in FIG. 5.

The valve 14 is centrally mounted in the bottom wall 22a of the reservoir 12. The function of the valve 14 is to regulate the outflow of water from the reservoir 12. As shown in FIGS. 2 and 3, the reservoir bottom wall 22a defines a rod hole 48 within its center. The reservoir bottom wall 22a also defines three draining apertures 49 along a circle concentric with the rod hole 48, and furthermore, the reservoir bottom wall 22a defines spring retaining ribs 50 which form an interrupted circle concentric with the rod hole 48 and which surround the apertures 49 on the inside surface of the reservoir bottom wall 22a. For the preferred embodiment of the present invention, including a reservoir with a capacity of about 27.5 fl. oz. (approx. 800 ml.), the preferred diameter of each aperture 49 is between about 0.044 and 0.046 inches (approx. 1.1 to 1.2 mm.). The apertures are sized so that the water exiting the draining hole 33 into the pitcher 11 is at the desired temperature.

On the outer side of reservoir bottom wall 22a, concentric with the rod hole 48 and extending laterally beyond the draining apertures 49, the reservoir bottom wall 22a defines a flat circular sealing ledge 54. A vertical plunger rod 51 extends slidingly through the rod hole 48. The rod end portion 52 which extends outwardly from the reservoir 12 through the rod hole 48 is threaded. Screwed onto the rod end portion 52 is a spreader plate 53.

As shown by FIG. 4, the spreader plate 53 is a circular plate 55 which defines on its upper surface a peripheral lip 56, a centrally located ring 57, and radially disposed and symmetrically arranged quartets of dividing ribs 58 and channeling ribs 59. The dividing ribs 58 extend from the peripheral lip 56 to the centrally located ring 57, while and channeling ribs 59 extend from the peripheral lip 56 only part way toward the centrally located ring 57. Thus the dividing ribs 58 divide the spreader plate 55 into four equal drip basins 64. In each drip basin 64 the spreader plate 55 defines two dripping apertures 65, one on each side of the channeling rib 59. The centrally located ring 57 circumscribes a sealing surface 60. The centrally located ring 57 also has formed therein four symmetrically located channels 61, each one of which opens onto one of the four drip basins 64 opposite the dividing rib 59 to provide communication from the sealing surface 60 to the drip basins 64.

As shown in FIGS. 1 and 2, the plunger rod 51 defines a spring retaining ledge 63 along its length. A helical compression spring 62 extends from between the spring retaining ribs 50 on the bottom wall 22a of the reservoir 12 to the spring retaining ledge 63. The spring 62 abuts both the reservoir bottom wall 22a and the spring retaining ledge 63, urging the plunger rod 51 upwards, thereby pressing the sealing surface 60 of the spreader plate 53 against the sealing ledge 54 of the reservoir bottom wall 22a to cover draining apertures 49. Thus the valve 14 is normally closed, if the plunger rod 51 is not depressed.

Applying downward axial pressure to the plunger rod 51 sufficient to overcome the force of the spring 62 causes the plunger rod 51 to move downwardly and to carry the spreader plate 53 with it, as shown by dotted lines in FIG. 2. This results in the separation of the sealing surface 60 from the sealing ledge 54 and allows the draining apertures 49 to drain water from the reservoir 12 onto the sealing surface 60. From the sealing surface 60 the water is directed by the channels 61 in substantially equal amounts to the drip basins 64. In each drip basin 64, the channeling rib 59 aids to divide the water between the two dripping apertures 65, and through the dripping apertures 65 the water drips into the basket 13 mounted below.

The axial pressure necessary to open the valve 14 can be applied to the plunger rod 51 by means such as a cover 67, shown in FIG. 1. With the cover 67 removed, the plunger rod 51 extends slightly higher than the top of reservoir 12. The placing of the cover 67 firmly on top of the reservoir 12 depresses the plunger rod 51 and thus opens the valve 14. To keep the cover 67 in place and thereby continually apply pressure to the rod 51, there is provided in the preferred embodiment a locking mechanism comprised of at least two symmetrically spaced and outwardly extending tabs 69 defined by the outer periphery of the cover 67, and at least two "L"-shaped brackets 68 defined by the upper edge of the pitcher 11. The brackets 68 are sized and positioned to receive and hold the tabs 69. The brackets 68 and the tabs 69 are brought into engagement by means of twisting the cover 67 relative to the pitcher 11 until the brackets 68 and the tabs 69 meet. To align and guide the cover 67 relative to the pitcher 11 during twisting, the lower surface of the cover 67 defines a guiding ring 71 extending downwardly therefrom. The guiding ring 71 is sized and shaped to fit slidingly into the circular space 73 formed by the reservoir side wall 22 and the pitcher side wall 19. A handle 70 is molded integrally with the top of the cover 67 for handling and twisting the cover 67.

The coffee ground basket 13, like the pitcher 11 and the reservoir 12, is a molded shell having a substantially cylindrical basket side wall 29 with one end of the cylinder closed by a basket bottom wall 29a. The basket 13 lies below the reservoir 12 and is removably suspended therefrom. The side wall 29 of the basket 13 has along its upper portion a finger ring 30 which encircles the wall 29 and extends outwardly therefrom. The finger ring 30 is molded integrally with the basket side wall 29. The finger ring 30 defines outwardly extending fingers 31, shown more clearly in FIG. 5, which fingers are adapted to engage the "L"-shaped holding notches 28 of the holding ring 27 of the reservoir 12, and thus to hold the basket 13 attached to the outer bottom of the reservoir 12. Formed along the periphery of the basket bottom wall 29a on the outside of the basket 13 are three legs 32 which serve to provide stability to the basket 13 when it is removed from the pitcher 11 and is standing on a surface, with or without the reservoir 12 still attached to the basket. The basket bottom wall 29a has a centrally located circular draining, or straining, hole 33 formed therein (See FIG. 5). The draining hole 33 serves the dual purpose of draining the coffee 17 from the basket 13 and of providing a recess for mounting the filter 24. Surrounding the draining hole 33 on the inside surface of the basket bottom wall 29a are inner and outer supporting ribs 34 and 35, respectively, which form both an inner and an outer broken concentric circle, around the draining hole 33 (See also FIG. 8). The inner and outer supporting ribs 34, 35 serve to keep the filter 24 suspended above the basket bottom 29a and thus to provide a collecting basin 74 through which the coffee 17 dripping through the filter 24 can flow to the draining hole 33. Defining the draining hole 33 in the outer side of the basket bottom wall 29a is a keeper ring 36 having an inwardly extending keeper lip 38 along its inner bottom periphery. The keeper ring 36 is shown in greater detail in FIG. 6. The keeper lip 38 serves to engage keeper 44 of the filter 24 to hold the filter 24 securely in place. The keeper ring 36 further defines a draining slot 47 to aid the drainage of coffee.

The filter 24 is mounted inside the basket 13 for the purpose of preventing coffee grounds 37 from being carried by water passing therethrough into the pitcher 11. As shown in FIG. 5, the filter 24 comprises a carrier ring 40 connected to a central slug 41 by radially placed carrier ribs 42. The area inside the carrier ring 40 is covered by a fine screen 43 which the carrier ring 40 and the carrier ribs 42 support. The filter 24 is sized to cover the whole bottom of the basket 13. As shown in FIG. 6, the filter slug 41 has a slotted keeper 44 extending downwardly therefrom. The keeper 44 has two hook portions 45 which define a keeper slot 46 between them. Upon assembly of the coffee maker 10, the keeper 44 extends through the draining hole 33 of the basket 13 and its hook portions 45 engage the keeper lip 38 of the keeper ring 36 which surrounds the draining hole 33, as shown in FIG. 7, thus serving to hold the filter 24 securely in place inside the basket 13. The diameter of the upper portion of the keeper 44 is made smaller than the diameter of the draining hole 33: thus, as shown in FIG. 6, a passageway 75 exists in the draining hole 33 around the keeper 44 through which passageway coffee can flow out from the basket 13. Thus, when the valve 14 is opened, the water 66 travels the following path through the basket 13: through the coffee grounds 37 and the screen 43 of the filter 24 into the collecting basin 74 and therealong into the passageway 75 of the draining hole 33, out of the basket 13 through the slots 46 and 47, and into the pitcher 11.

The coffee maker 10 has the capacity for brewing five cups of coffee (of 5 fl. oz. (approx. 150 ml.) each) at one time: the finished brew capacity of the pitcher 11, with the reservoir 12 and the basket 13 mounted therein, is 25 fl. oz. (approx. 750 ml.). The empty pitcher 11 has a capacity of 2.5 qts. (approx. 2.4 l.). The capacity of the reservoir 12 is 27.5 fl. oz. (approx. 0.8 l.).

To use the coffee maker 10 to brew a pitcher of coffee, the following procedure is followed. This procedure is the preferred method of the present invention. The filter 24 is securely mounted inside the basket 13 by pushing the filter keeper 44 into the basket draining hole 33. For ease of cleaning and improvment in the clarity of brewed coffee, an optional paper filter may be placed on top of the filter 24. An amount of coffee grounds 37 corresponding to the number of cups of coffee desired is placed inside the basket 13. Tests indicate that from 1.5 to 2 level teaspoons of coffee grounds per cup (about 5 fl. oz. or 150 ml.) of coffee produce good coffee. Fewer grounds may be used to make weaker coffee, more grounds to make stronger coffee. The basket 13 with the grounds 37 therein is attached to the bottom of reservoir 12 by aligning the reservoir holding notches 28 with the basket fingers 31 and then twisting the basket 13 relative to the reservoir 12 to engage the fingers 31 with the holding notches 28. The reservoir 12 and the basket 13 are now positioned inside the pitcher 11 such that the reservoir peripheral ledges 23 seat on the pitcher circumferential step 18. The reservoir 12 is filled with tap water 66 up to the cup gradation 26 that indicates the number of cups of coffee desired. A microwave oven is preset for a predetermined time. Tests with the coffee maker 10 indicate that converting tap water with a temperature of 60° F. (approx. 15.5° C.) into finished brew with a desirable temperature of 170°–190° F. (approx. 76°–88° C.) in a microwave oven having 650 watts output will take approximately 5 mins. 45 secs. for three cups, 6 mins. 30 secs. for four cups, and 7 mins. 45 secs. for 5 cups of coffee. The cover 67 is positioned on top of the pitcher 11 and twisted into locked position such that the cover brackets 68 engage the pitcher tabs 69, thus initiating the outflow of the water 66 from the reservoir 12. The coffee maker 10 is placed inside the microwave oven, and the oven is turned on. When the oven turns off, the coffee maker 10 with the hot, freshly brewed coffee in the pitcher 11 is removed from the oven.

All components of the coffee maker 10 of the preferred embodiment, with the exception of the spring 62 are molded of material which is substantially transparent to microwave radiation. In other words, the radiation passes through the material without heating it to any substantial degree. Numerous suitable materials are available from which all components except for the spring can be made, including but not limited to polysulfone, polycarbonate, polypropylene, and styrene copolymers. In the preferred embodiment the pitcher 11 is made from polysulfone; the cover 67, the water reservoir 12, the spreader plate 53 and the plunger rod 51 are made from polycarbonate or styrene copolymer; the coffee ground basket 13 and the filter 24 with the exception of the screen 43 are made from polypropylene. In the preferred embodiment, the screen 43 is polyester. Also, the valve spring 62 of the preferred embodiment is made of stainless steel.

Because the coffee maker 10 itself absorbs substantially no microwave energy, the energy of the oven is used primarily to heat the water. The apparatus of the present invention therefore takes great advantage of a microwave oven's ability to quickly bring a fixed amount of water to a desired temperature. Locking of the cover 67 onto the pitcher 11 opens the valve 14 and initiates the flow of the water 66 onto the coffee grounds 37, as explained above. The water flow is thereby initiated immediately prior to the application of microwave energy to the coffee maker, and because the water outflow from the reservoir 12 is gradual and because the water begins to heat up immediately upon application of microwave energy to the coffee maker 10, the amount of unheated water that flows onto the coffee grounds 37 is small. Furthermore, test results indicate that even a thirty-second delay between securing the cover 67 and commencing application of microwave energy does not seem to vary the coffee flavor substantially.

The microwave energy heats the water wherever it may be in the coffee maker 10. The unheated water is the first water to come into contact with the dry coffee grounds and therefore it will be substantally retained by the grounds 37 until they are fully soaked. This delay in the flow of water through the grounds 37 will generally be adequate to allow the microwave energy to heat the water while it is still in contact with the grounds, so that very little, if any, cold water will have passed over the grounds 37 into the pitcher 11 below. The microwave energy heats all of the water, but it heats small amounts of water faster than large amounts. Therefore, while the water in the reservoir 12 is gradually being preheated, the controlled, relatively small stream of water leaving the reservoir 12 through the valve 14 is heated quickly, so that the coffee grounds 37 have a steady stream of hot water passing through them. For this reason, it is not necessary to await the heating of all of the water in the reservoir 12 before initiating the flow of water onto the coffee grounds 37. The microwave energy also maintains the temperature of the brewed coffee 17 in the pitcher 11 while the remaining coffee is still in the process of being brewed.

Of course, it should be understood that various changes and modifications to the preferred embodiment described above will be apparent to those skilled in the art. For example, the coffee maker is not limited in use to brewing coffee, but may also be used for heating water, making soups, or brewing hot tea or chocolate. In fact because the cover 67 rests directly on the pitcher 11, the combination of the cover 67 and the pitcher 11 can be used without the other inner portions of the coffee maker to heat or reheat foods in the microwave oven. Various other means, such as switches or twist knobs, may be utilized to open the valve. The reservoir and the basket may be adpated to rest on top of, instead of inside, the pitcher. Or the capacity of the coffee maker may be varied. As will be apparent to those of ordinary skill, these and other changes and modifications can be made without departing from the spirit or scope of the present invention.

I claim:

1. An apparatus for making coffee through the use of microwave energy, comprising:
    a water reservoir with at least one aperture near the bottom thereof;
    a coffee grounds basket having at least one drain hole therein and positioned to receive water from said water reservoir through said aperture;
    a pitcher positioned to receive brewed coffee from said drain hole in said coffee grounds basket;
    a cover removably mounted over said water reservoir; and
    valve means for controlling the flow of water through said aperture, said valve means being opened by said cover when said cover is mounted over said water reservoir.

2. An apparatus for brewing coffee in a microwave oven, comprising:
    a water reservoir with at least one aperture near the bottom thereof;
    a coffee grounds basket having at least one drain hole therein and positioned to receive water from said reservoir through said aperture;
    a pitcher positioned to receive brewed coffee from said drain hole in said coffee grounds basket;
    a cover removably mounted over said water reservoir;
    a valve for controlling the flow of water through said aperture mounted in the bottom of said water reservoir adjacent said aperture;
    a plunger rod connected to and extending upwardly from said valve so that when said cover is mounted on said pitcher, said plunger rod is depressed, thereby opening the valve to permit gradual draining of water from the water reservoir into the coffee grounds basket.

3. An apparatus for brewing coffee in a microwave oven, comprising:
   a water reservoir having a bottom wall defining a centrally positioned rod hole and a plurality of drain apertures surrounding the rod hole;
   a coffee grounds basket having strainer holes therein and positioned to receive water from said reservoir through said apertures;
   a pitcher positioned to receive brewed coffee from said strainer holes in said coffee grounds basket;
   a plunger rod having a first end portion extending through the water reservoir rod hole and a second end portion extending substantially vertically the height of the water reservoir;
   a plate mounted to the first end portion of said plunger rod, said plate defining a sealing surface for closing the drain holes;
   a coiled compression spring positioned around the plunger rod, said spring having a first end abutting the reservoir bottom wall and a second end abutting the rod, such that the sealing surface is urged toward the drain apertures by means of the force exerted by the compression spring; and
   a cover removably mounted over said water reservoir, and axially depressing said plunger rod when mounted such that said plate is moved away from said drain apertures, thereby permitting water to flow from said water reservoir into said coffee grounds basket.

4. The coffee making apparatus of claim 3 wherein the spring is made from stainless steel and the remaining elements of the apparatus are made from a polycarbonate.

5. The coffee making apparatus of claim 3 further comprising means for applying microwave energy to heat the water after said plunger has been depressed.

6. The coffee making apparatus of claims 1, or 3 further comprising means for applying microwave energy to the water, after the valve means has been opened for heating the water.

7. The coffee making apparatus of claims 1, 2, or 3 wherein the apparatus is substantially transparent to microwaves.

8. An apparatus for brewing coffee in a microwave oven, comprising:
   a water reservoir having a bottom wall defining a centrally positioned rod hole and a plurality of drain apertures surrounding said rod hole;
   a coffee grounds basket having strainer holes therein and positioned to receive water from said reservoir through said apertures;
   a pitcher positioned to receive brewed coffee from said strainer holes in said coffee grounds basket;
   a plunger rod having a first end portion extending through said water reservoir rod hole and a second end portion extending substantially vertically for the height of said water reservoir;
   a plate mounted to the first end portion of said plunger rod, said plate defining a sealing surface for closing the drain holes;
   a coiled compression spring positioned around said plunger rod, said spring having a first end abutting the bottom wall of the reservoir and a second end abutting said plunger rod, such that the sealing surface is urged toward the drain apertures by the force exerted by the compression spring;
   a cover removably mounted over said water reservoir; and
   means for axially depressing said plunger rod such that said plate is moved away from said drain apertures, thereby permitting water to flow from said water reservoir into said coffee grounds basket.

9. The coffee making apparatus of claim 8 wherein the apparatus is substantially transparent to microwaves.

10. The coffee making apparatus of claim 8 further comprising means for applying microwave energy to heat the water after said plunger has been depressed.

11. The coffee making apparatus of claim 8 wherein said spring is made from stainless steel and the remaining elements of the apparatus are made from a polycarbonate.

* * * * *